US011325631B2

(12) United States Patent
Singh et al.

(10) Patent No.: US 11,325,631 B2
(45) Date of Patent: May 10, 2022

(54) FOLDABLE FRAME ASSEMBLY AND STROLLER

(71) Applicant: THULE SWEDEN AB, Hillerstorp (SE)

(72) Inventors: Paramjit Singh, Calgary (CA); Roger McPherson, Calgary (CA); Wesley Fleming, Centennial, CO (US); Wilbert Hak, Skillingaryd (SE); Oskar Juhlin, Gustavsberg (SE); Peter Ejvinsson, Stockholm (SE)

(73) Assignee: Thule Sweden AB, Hillerstorp (SE)

( * ) Notice: Subject to any disclaimer, the term of this patent is extended or adjusted under 35 U.S.C. 154(b) by 48 days.

(21) Appl. No.: 16/887,454

(22) Filed: May 29, 2020

(65) Prior Publication Data

US 2020/0385044 A1 Dec. 10, 2020

(30) Foreign Application Priority Data

Jun. 5, 2019 (EP) ..................................... 19178448

(51) Int. Cl.
| | |
|---|---|
| *B62B 7/06* | (2006.01) |
| *B62B 7/04* | (2006.01) |
| *B62B 9/08* | (2006.01) |
| *B62B 9/20* | (2006.01) |
| *B62B 9/14* | (2006.01) |

(52) U.S. Cl.
CPC .............. *B62B 7/062* (2013.01); *B62B 7/044* (2013.01); *B62B 9/085* (2013.01); *B62B 9/087* (2013.01); *B62B 9/20* (2013.01); *B62B 9/142* (2013.01)

(58) Field of Classification Search
CPC ......... B62B 7/062; B62B 7/044; B62B 9/085; B62B 9/087; B62B 9/20; B62B 9/142
See application file for complete search history.

(56) References Cited

U.S. PATENT DOCUMENTS

| | | | |
|---|---|---|---|
| 9,233,704 B2 * | 1/2016 | Wu | ........................... B62B 7/08 |
| 9,638,243 B2 * | 5/2017 | Li | ........................... B62B 9/005 |
| 9,718,488 B2 * | 8/2017 | Singh | ........................ B62B 7/06 |
| 9,855,964 B2 * | 1/2018 | Sack | .......................... B62B 7/10 |

(Continued)

FOREIGN PATENT DOCUMENTS

| | | |
|---|---|---|
| CN | 195292222 B | 12/2017 |
| EP | 2703250 A2 | 3/2014 |
| EP | 2871112 A2 | 5/2015 |

OTHER PUBLICATIONS

European Search Report and Written Opinion for European Patent Application No. 19178448.7, dated Jan. 8, 2020, 9 pages.

*Primary Examiner* — John D Walters

(74) *Attorney, Agent, or Firm* — Sterne, Kessler, Goldstein & Fox P.L.L.C.

(57) ABSTRACT

A stroller and foldable frame assembly for a stroller includes a locking mechanism adjustable between a locked position and an unlocked position. The locking mechanism is configured to releasably lock the foldable frame assembly in its use configuration and/or storage configuration by releasably and internally locking at least one of a respective swivel joint assembly of the frame assembly. The locking mechanism includes an actuation element configured to adjust the locking mechanism between the unlocked and the locked position that is arranged spaced apart transversely to a swivel axis of the respective at least one internally lockable swivel joint.

26 Claims, 7 Drawing Sheets

(56) References Cited

U.S. PATENT DOCUMENTS

| | | | |
|---|---|---|---|
| 10,023,217 B2 * | 7/2018 | Sack | .................. B62B 7/10 |
| 10,286,940 B2 * | 5/2019 | Chen | .................. B62B 7/068 |
| 2015/0076776 A1 | 3/2015 | Wu et al. | |
| 2017/0174244 A1 | 6/2017 | Sack et al. | |
| 2017/0247043 A1 | 8/2017 | Sack et al. | |

* cited by examiner

FOLDABLE FRAME ASSEMBLY AND STROLLER

TECHNICAL FIELD

The present invention relates to a foldable frame assembly for a stroller and a stroller, in particular a foldable stroller. A stroller may be understood as a hand-pushed vehicle to carry babies, young infants or smaller children. As such, it may also be referred to as a child carrier, baby transport or baby carrier.

BACKGROUND

Modern strollers must fulfill a variety of requirements, the foremost being reliability and comfort of use. As such, strollers need to be sturdy enough to withstand repeated use while also being light and easy to handle.

Regarding comfort, foldable strollers have been proven to be very comfortable for users since they permit easy storage and transportation in a folded configuration with a reduced size. In a deployed position, the stroller may also provide ample space, even permitting the carriage of additional goods, such as groceries, in addition to the child or infant arranged in the stroller.

However, the capability of a stroller to be folded may result in a weight increase and/or in durability issues due to the additional required joints and parts. Further, folding a stroller may be cumbersome.

SUMMARY

It is an object of the present disclosure to provide an improved foldable frame for a stroller and a stroller. In particular, it is an object to provide a foldable frame and foldable stroller that is especially comfortable to use.

This object is solved by the subject-matter of the independent claims. Further preferred embodiments and expedient developments may be taken from the dependent claims. Additional and/or alternative preferred embodiments are addressed in the below discussed aspects and embodiments, wherein preferred embodiments and expedient developments of one aspect of the disclosure may also constitute preferred embodiments and expedient developments of other aspects of the disclosure.

A first aspect of the disclosure relates to a foldable frame assembly for a stroller. The frame assembly may comprise a first forward lower frame component with a first end configured for attachment of at least one forward wheel and with an opposite second end attached to a first swivel joint assembly. The one or more forward wheels may also be considered as part of the frame assembly. The frame may further comprise a second rearward frame component with a first end attached to the first swivel joint assembly and with an opposite second end configured for arrangement of a handle assembly. The handle assembly may be configured for pushing the frame assembly respectively the stroller when standing on the ground on its wheels. The handle assembly may also be part of the frame assembly and fixedly or removably attached to the second rearward frame component. The frame assembly may also comprise a third rearward lower frame component with a first end attached to a second swivel joint assembly arranged on the first frame component between the first end and the second end of the first frame component and with an opposite second end configured for attachment of at least one rearward wheel. Again, any rearward wheel may also be a part of the frame assembly. Further, the frame assembly may comprise a rearward fourth link frame component with a first end attached to a third swivel joint assembly arranged on the second frame component between the first end and the second end of the second frame component and with an opposite second end attached to a fourth swivel joint assembly arranged on the third frame component, preferably between the first end and the second end of the third frame component. For example, the fourth swivel joint assembly may be provided on the second end of the third frame component at a position where the at least one rear wheel is attached or between the first end and the second end of the third frame component. The frame assembly may be free of additional frame components and/or swivel joint assemblies, in particular besides those explicitly described herein and/or shown in the figures.

Additionally, the frame assembly may comprise a locking mechanism adjustable between a locked position and an unlocked position. The locking mechanism may prevent unwanted folding and/or unfolding of the frame, thus for example enhancing safety during use in the deployed position and facilitating transport and storage in the folded position. The deployed position may also be referred to as the use configuration, unfolded and/or child carrying configuration and the folded position as the storage, collapsed and/or transport configuration.

The locking mechanism may be configured to releasably lock the foldable frame assembly in its use configuration and/or its storage configuration by releasably and internally locking at least one of the respective swivel joint assemblies. The locking mechanism may comprise an actuation element configured to adjust the locking mechanism between the unlocked and the locked position that is arranged spaced apart transversely to a swivel axis of an internally lockable swivel joint of the respective swivel joint assembly. In other words, the actuation element may be arranged at a distance from the swivel axis or offset from the swivel axis. In particular, a rotational axis of the actuation element may be offset from the swivel axis. The swivel joint assembly may comprise one or more swivel joints. Each of those swivel joints may be lockable, in particular internally lockable, or just one. The internal locking may enhance safety and reliability since the internal arrangement may prevent accidents and/or since any internal component may be arranged protected from the environment. For example, the internally locking may prevent accidents such as fingers stuck in a locking device configured as an externally accessible locking pin.

Alternatively or additionally, the actuation element may not be arranged on and/or along the swivel axis of the respective lockable swivel joint(s). This may improve handling and facilitate design of the frame assembly. In particular, the actuation element arranged spaced apart from the swivel axis may result in a torque and/or force being exerted on the frame assembly when actuating the actuation element that may cause the frame assembly to automatically change configuration or at least support such a configuration change. Further, the actuation element may thus be arranged such that more space is available for carrying the infant, young child or baby with the stroller and possible additional items. For example, if a central swivel joint is lockable, the actuation element does not need to be arranged transversely on a cross-bar along a central swivel axis of this joint, which may hinder placement of a baby-carrying bowl in a central space of the stroller.

Alternatively or additionally, the actuation element may also be transversely arranged to a movement axis of a locking device of the locking mechanism. The locking device of the locking mechanism may be a part that actually rigidly connects two parts of the swivel joint to lock it into its current position, e.g. to prevent further swiveling and/or rotation relatively to each other. Transversely may be defined as any direction not laying on the respective axis. Preferably, the actuation element is orthogonally spaced apart from the respective axis. In particular, the actuation element may have an actuation axis, around which at least a part of the actuation element may rotate during locking and/or unlocking of the frame, which may be arranged parallel to the axis from which the actuation element is spaced apart. In that case, the actuation axis of the actuation element does not intersect the swivel axis of the lockable swivel joint, which may also be defined as spaced apart in the present context. Spaced apart may be defined as having no direct contact, being distanced to each other and/or as having spaced apart axes of actuation, in particular a swivel axis of the actuation element and respective axes of the joint assemblies being spaced apart. Spaced apart may also be defined as being not directly connected to each other.

The lockable swivel joint may be internally lockable with a locking device of the locking mechanism arranged within the at least one of the joints of the respective lockable joint assembly, in particular within a housing formed by two halves of the joint. The locking mechanism may comprise at least one locking device arranged inside an interior space of a lockable swivel joint of the respective swivel joint assembly. The locking mechanism may be configured to release movement of the foldable frame between the use configuration and the storage configuration in at least one of those configurations, preferably both, in its unlocked position and prevent such movement in its locked position. The use configuration may be a configuration where a stroller with such a frame may be used to be pushed on its wheels over the ground and possibly carry a child, toddler, infant, baby and/or items, such as groceries. Movement between the two configurations may involve rotation of one, some or all of the swivel joints of one, some, or all of the swivel joint assemblies. Correspondingly, movement between the two configurations may involve swiveling of one, some or all of the frame components around respective swivel axes of the swivel joint assemblies.

A lower frame component may be a frame component that is configured to be closest to the ground with at least one end when the stroller is standing on its wheels than, for example, other upper components. Correspondingly, an upper frame component may be further away from the ground, in particular substantially more spaced apart from the ground than a diameter of the wheels and/or arranged with one end, preferably both ends, above other lower components. For example, an upper frame component may be at least spaced apart from the ground by twice the wheel diameter when in the use configuration. The second rearward frame component may be an upper frame component in the use configuration.

Each component attached to a swivel joint assembly may swivel about a swivel axis, in particular relatively to other components attached thereto. Preferably, if a swivel joint assembly comprises a plurality of swivel joints, each of these swivel joints is arranged coaxially to each other. Any locking device may be configured to selectively lock or release movement of the swivel joint in which it is arranged. The above-detailed numbering, such as the first, second, and third assembly, may be understood to be only for the purpose of distinguishing each part from others. The frame assembly may be configured for the attachment of a baby and/or child carriage component thereto, such as a seat, bed and/or bowl.

Each frame component may comprise one or more elongated frame members. For example, each such frame member may be configured as a rod, bar and/or tube. All frame components and/or frame members may also be configured as single elongated frame members. In particular, each frame member may be configured as a hollow tube. A cross-section of such a tube may be, for example, circular, rectangular, square and/or elliptical. Each frame component and/or frame member may be elongatedly shaped and have only two corresponding opposite ends at each side of its elongated shape. The frame component and/or any of its frame members may have a curvature or bend along its longitudinal extension. Orientation of the frame components and/or the frame members may be defined as a straight imaginary line between its two opposite ends. Alternatively or additionally, orientation may be defined by the end faces of the frame components and/or frame members.

The frame assembly may be essentially symmetrical. In particular, the frame assembly may be symmetrically configured on both sides of a forward-backward direction; e.g. a left side may be identical to a right side. Correspondingly, each frame component may comprise a left frame member and a right frame member arranged on opposite sides of a plane of symmetry. Another option for symmetry is to arrange single parts centrally in the plane of symmetry. The left frame member and the right frame member of a frame component do not need to be necessarily directly be connected to each other. Alternatively, the frame assembly may be understood as comprising an even number of each frame component, in particular two of each frame component, for achieving symmetry. For example, the frame assembly may comprise two rearward lower frame components, wherein one is arranged on the left side and one on the right side of the plane of symmetry. Similar, the joint assemblies may comprise one swivel joint per frame member or may comprise a common swivel joint for attachment of all respective frame members of a respective frame component. The frame assembly may comprise two swivel joint assemblies each for symmetrical design. Deviation from the symmetric design may in particular be due to additional functions and/or may not be load-carrying. For example, the frame assembly may comprise a brake actuation element just on one side. Another example is a hook to carry a purse that is only provided on one side of the frame assembly. Nevertheless, overall symmetry of the frame design may still readily be discernible.

The forward-rearward direction may be defined with the frame assembly unfolded in its use configuration and orientated such that it would be standing on the wheels, if attached. Any handle assembly and/or connection for the handle assembly could be defined as facing backward and/or as being arranged on the rear-end. The upward-downward direction may be defined by the wheels and/or any child carrying arrangement. The ground and/or the wheels may be considered as being arranged at a bottom, downward facing end while the opposite end is at the upper side. The handle assembly may also be considered as being arranged on an upward end of the stroller. The forward direction may be defined as pushing direction and the rearward direction as pulling direction when moving the stroller. The forward end may have one wheel and backward end may have two wheels, with corresponding frame component configuration. The plane of symmetry may also define the forward-backward direction, e.g. with the forward-backward direction being in the plane of symmetry.

The frame assembly and/or a respective stroller may comprise one or more forward wheels, preferably attachable with an essentially vertical swivel axis for steering the stroller. The handle assembly may be a separate handle bar attached to the second end of the second frame component, in particular a C-shaped bar. The handle assembly may also comprise two separate handle elements, one on each of the left and right frame members of the second frame component. The handle assembly may also be integrally formed on or by the second frame component and/or one of its frame members.

Any link frame component may be configured similarly to other frame component, in particular with several frame members. The link component may also be referred to as the linkage frame component. Specifically, the linkage frame component may also be configured with symmetrically arranged frame members. A link frame component may be defined as a frame component that is attached to, in particular in between, two other frame components. Correspondingly, other frame components may be defined as having at least one free end where the frame assembly essentially terminates. The link component, in particular its frame members, may be structurally weaker, thinner and/or lighter than other frame components and/or their frame members. In particular, a link component may not be or at least not as much structurally load bearing as other frame components. The main or only purpose of a link component may be to cause one or more of the frame components to move, in particular swivel, when another frame component is moved, in particular swiveled. This synchronizes movement of the frame component when folding and/or unfolding the frame, which results in simpler folding by a user.

An attachment between two ends of a frame component may be defined as a connection to a frame component that is spaced apart to one or preferably both ends of a frame component, in particular of a frame member. For example, the second swivel joint assembly may comprise a swivel joint that is attached to a frame member of the first frame component between its two opposite ends.

Preferably the frame assembly is at least or only selectively lockable in the use configuration. Alternatively or additionally, the frame assembly may also be selectively lockable in the storage configuration. The locking mechanism is preferably biased towards its locked position, in particular spring-biased, to prevent unwanted configuration change of the foldable frame assembly. The locking mechanism may therefore automatically return to a locked state if the actuation element is released. The locking mechanism may comprise two locking devices, one in each swivel joint on each side for a left-right symmetrical foldable frame assembly. Alternatively, the frame assembly may be understood as comprising two locking mechanisms, one for each side of symmetry and a respective swivel joint or swivel joint assembly. In both cases, the frame assembly may comprise one common actuation element for both locking devices and/or locking mechanisms. Such an actuation element may be centrally arranged in the plane of symmetry. Alternatively, the actuation element may be arranged off-center. Nevertheless, such a frame assembly may be still considered symmetrically.

Any frame members configured for attachment of wheels may be called legs, in particular single frame members directly attached to a wheel. In particular, the third frame component may comprise two frame members, e.g. legs, that are not directly attached to each other but rather only attached to the first frame component and/or a cross-bar.

Preferably, the actuation element has a release position disengaging the locking mechanism and a lock position engaging the locking mechanism or at least allowing the locking mechanism to engage. The actuation element is preferably arranged on one of the frame components and/or the link component. The actuation element itself may also be configured to be locked in a position, for example with a sliding element, such as a bolt. This may prevent unwanted actuation of the actuation element. Before actuation of the actuation element is possible, such a lock needs to be disengaged. The actuation element may be automatically self-locking. For example, the sliding element may be biased to lock the actuation element in position, in particular spring-biased and/or in the lock position. This may prevent accidental actuation of the actuation element, possibly resulting in unwanted configuration change of the frame assembly.

In a further preferred embodiment of the frame assembly, the actuation element is configured as a handle, in particular as a carrying handle also configured for carrying the foldable frame assembly in its storage configuration. For example, such a handle may be a bar or grip longitudinally extending essentially in the left-right direction. A handle is easy to actuate. Preferably, the handle is swiveled for actuation of the locking mechanism. A carrying handle allows easy carrying of the frame assembly and stroller, in particular a one-handed carrying.

In a further preferred embodiment of the frame assembly, the actuation element is arranged transversely between two frame members of a frame component, in particular the first frame component. In such an arrangement, the actuation element may also structurally support the frame assembly. Preferably, the actuation element is arranged on the outside of the frame components and/or spaced apart to the first and/or second swivel joint assembly and/or any swivel joint assembly connecting frame components to each other.

In a further preferred embodiment of the frame assembly, the locking mechanism is configured for remote actuation by the actuation element. For example, the locking mechanism may comprise an actuation wire and/or actuation bar that connects the actuation element to the locking device for actuation. If there are more than one locking devices and/or lockable swivel joints, the locking mechanism may also comprise one respective wire and/or actuation bar that connects the actuation element to each locking device and/or swivel joint for actuation respectively locking. In particular, such an actuation wire or bar may be arranged internally in a frame component, in particular frame members, connecting the actuation element to the respective swivel joint. For that purpose, the frame members may have an internal space such as a through hole for routing the wire or bar. The wire and/or bar may be configured to transmit an actuation force. Preferably the wire is displaced during actuation. For example, swiveling of the actuation element may cause the wire to pull on a locking device. Preferably, the actuation element is connected to a locking device internally arranged in the lockable swivel joint with a wire for its actuation, wherein the wire is preferably arranged at least partially or completely within the frame assembly. Remote actuation allows arrangement of the actuation element independently of the respective lockable swivel joint assemblies. Internally routing may protect the locking mechanism and in particular actuation wires and/or bars, resulting in a more reliable frame assembly.

In a further preferred embodiment of the frame assembly, the frame assembly is configured to self-collapse from the use configuration in the storage configuration in response to the actuation of the actuation element, in particular in response to an upward pulling motion on the actuation element. In particular, upward pulling on the actuation element may cause gravity assisted collapsing of the foldable frame into its storage configuration, preferably once the frame assembly or stroller has been lifted from the ground. Such a configuration allows easy and intuitive folding of the frame assembly. In particular, the frame assembly or stroller may collapse into the storage configuration if picked up at the actuation element. If the actuation element is configured as a carrying handle, a user does not need to relocate his hands for subsequent carrying of the frame assembly or stroller either.

In a further preferred embodiment of the frame assembly, the respective swivel joint comprises two hinge elements that define an interior space in which a locking device of the locking mechanism is arranged, wherein the two hinge elements may be rotated relatively to each other about a common swivel axis. The locking device may comprise, for example, a locking element and/or a displacement element. The respective frame components, frame members and/or link components may be attached to corresponding hinge elements with their respective ends. Preferably, the interior space is not just defined by a cover element that serves no further purpose besides concealing the locking device and/or other components of the hinge. Instead, the interior space is preferably at least partially or completely defined by functional, e.g. load bearing, parts of the respective swivel joint. In that case, a number of parts may be low and/or the sturdiness of the casing defining the interior space may be high.

In a further preferred embodiment of the frame assembly, the locking device comprises a locking element moveable between a first position and a second position along the swivel axis in the interior space of the swivel joint, wherein in the first position the locking element locks the two hinge elements in their relative rotational positions to each other and wherein in the second position the locking element releases rotational movement of the two hinge elements. Such a locking element may also be configured to transform a rotational or swivel movement of the actuation element in a transversal movement. This may further increase freedom of design and/or arrangement of the actuation element. The locking element may correspond to the before-mentioned locking device. However, the locking device may also be understood as comprising the locking element and the hinge elements with which it interacts and/or on which the locking element is supported. The locking element may provide a mechanical connection; in particular a positive-locking and/or form-fitting connection, alternatively or additionally a frictional connection. Preferably, such a connection with at least one of the hinge elements may selectively be engaged or disengaged by movement of the locking element, in particular caused by a displacement element and/or inclined ramps.

In a further preferred embodiment of the frame assembly, the frame assembly is configured so that an adjustment of the locking mechanism, in particular an actuation of the actuation element, causes a rotation of a displacement element of the locking mechanism around the swivel axis, wherein the locking mechanism comprises an inclined ramp arranged on a surface facing the locking element, so that rotation of the displacement element causes it to glide along the inclined ramp and moves the locking element transversely between the first position and the second position along the swivel axis. An inclined ramp is a very reliable means to transform rotational movement of the displacement element and/or actuation element in transverse movement of the locking element. Further, such an inclined ramp may provide very high or low transmission ratios. Accordingly, very small or very large movements of the actuation element in relation to displacement distance of the element for engaging or disengaging the lock may be required. Again, this may facilitate design and/or arrangement of the actuation element. The displacement element may be the element that is remotely connected to the actuation element, for example with a wire and/or bar. The displacement element may also be part of the locking device.

In a further preferred embodiment of the frame assembly, the first frame component comprises a cross-bar member essentially extending in a left-right direction, wherein preferably the third frame component is attached to the cross-bar via the second swivel joint assembly and/or wherein preferably the actuation element is arranged on the cross-bar member. Preferably, the third frame component is only attached to the first frame component at the cross-bar via the second swivel joint assembly. In particular, the third frame component comprises one frame member per wheel and each frame is attached separately to the cross-bar member. Such an attachment may allow to fold the two respective legs independently and/or to move towards or away from each other during folding/unfolding of the frame. The legs or frame members do not need to have a common axis of motion during the folding of the frame assembly, which may allow a more compact storage configuration and/or a use configuration with a wider wheel base. In particular in the case of two rear wheels, each corresponding leg may be arranged closer to each other with the wheel carrying end in the storage configuration than in the use configuration. In this way, a width of the stroller defined by the rear wheels in unfolded condition may be reduced by folding to a width which is smaller than a width defined by other elements of the stroller, for example the second rearward frame component. The cross-bar member may be provided transversely, in particular perpendicular, to frame members such as bars provided between the first and second end of the first frame component and/or be attached thereto. Any cross-bar member may be similar to other frame members, in particular being a hollow tube or bar.

In a further preferred embodiment of the frame assembly, in the storage configuration the frame components, in particular their respective ends, are arranged adjacent to each other and/or the frame components, in particular regarding a connection between their respective first and second ends, essentially extend in the same direction and/or parallel to each other and/or wherein the first frame component and the third frame component are arranged so that the frame assembly may stand on respective wheels attached to the frame assembly, and/or where the first end of the first frame component and the second end of the second frame component are arranged adjacent to each other, in particular with the attached wheels overlapping in a left-right direction. Each of these features may result in a particular compact, comfortable and/or resilient storage configuration of the frame assembly. Adjacent arrangement of parts does not require these parts to touch each other.

In a further preferred embodiment of the frame assembly, in the use configuration the first frame component extends upwardly from its first end to its second end, in particular upwardly in a rearward direction and/or the second frame component extends upwardly from its first end to its second end, in particular upwardly in a rearward direction and/or the second frame component is an essentially straight extension of the first frame component and/or the second frame component constitutes essentially an elongation of the first frame component and/or essentially extends in the same direction and/or the third frame component extends downwardly from its first end to its second end, in particular downwardly in a rearward direction and/or the fourth frame component extends downwardly from its first end to its second end, in particular downwardly in a rearward direction or essentially vertically and/or any swivel axis of the first, third and/or fourth swivel joint assembly extends essentially horizontally and/or any swivel axis of the second swivel joint assembly is tilted downwardly towards a center of the frame assembly. Each of these features may result in a particular comfortable and/or resilient use configuration. Frame members of the second frame component and of the first frame component may essentially form a straight line along their elongation in the use configuration of the frame assembly. The center may correspond to the plane of symmetry and/or lay on the plane of symmetry. The swivel axis, also called pivot axis, of the first, third and/or fourth swivel joint may extend essentially transverse to the forward-backward direction, in particular orthogonally thereto, specifically in the left-right direction.

In case of two rear legs, the swivel axes of the second swivel joint assembly may intersect, in particular in the plane of symmetry and/or lower than the actual upper end of each leg and/or location of each swivel joint and/or at an angle. In particular, the respective swivel joints of the second swivel joint assembly may be arranged such that the second end of each frame member of the third frame component with a wheel attached thereto is moving inward in a left-right direction when folding the frame.

In a further preferred embodiment of the frame assembly, the locking device is arranged inside a swivel joint of the first swivel joint assembly and/or the third frame component is attached to the first frame component closer to the second end of the first frame component than to the first end of the first frame component and/or the fourth frame component is attached to the second frame component closer to the first end of the second frame component than to the second end of the second frame component and/or the fourth frame component is attached to the third frame component closer to the second end of the third frame component than to the first end of the third frame component and/or the fourth swivel joint assembly comprises at least one frame member swiveably connected with a first end to the second end of the fourth frame component and rigidly or swiveably connected to the third frame component with an opposite second end and/or the second swivel joint assembly comprises brackets that guide any attached frame members of the third frame component inwardly towards a center of the frame assembly when folding the frame assembly from the use configuration into the storage configuration, in particular such that any rearward wheels attached to the frame members are moved towards each other when folding the frame assembly from the use configuration into the storage configuration, wherein preferably two frame members are provided and each of them being coupled to the second swivel joint assembly swivelable about a swivel axis which are inclined with respect to a longitudinal middle plane of the frame assembly, preferably a plane of symmetry, wherein preferably the swivel axes intersect in the longitudinal middle plane or the plane of symmetry at an angle and/or at a position located below an upper end of the frame members. Each of these features may result in increased structural load bearing capacity of the frame assembly, in particular increased resistance to loads during normal stroller use and/or transportation. Accordingly, components may also be designed lighter without reducing reliability of the stroller. The fourth swivel joint may comprise a frame component, in particular two frame members symmetrically arranged with respect to the forward-backward plane and or with left-right symmetry. A frame member of the fourth swivel joint assembly may be configured as a straight extension of the fourth frame member in the use configuration.

In a further preferred embodiment of the frame assembly, the wheels and/or respective ends of the frame components configured for the attachment of the wheels move towards each other when folding the frame assembly from the use configuration into the storage configuration. Accordingly, the frame assembly may be particular compact in the storage configuration. Correspondingly, the wheel base of the stroller may be particular wide in the use configuration, thus increasing resistance of the stroller against falling over sideways and/or transverse to the forward-backward direction.

A second aspect of the disclosure relates to a stroller. The stroller may comprise the foldable frame assembly according to the first aspect of the disclosure. In particular, the stroller may comprise three or four wheels, a braking system for at least one of the wheels and/or a baby and/or child carriage component, preferably a carriage component that is configured to be folded between a use configuration and a storage configuration together with the frame assembly.

Other features of the present disclosure will be apparent from consideration of the information contained above as well as in or in combination with the following detailed description, drawings and claims. The present disclosure is illustrated by way of example, and not by way of limitation, in the figures of the accompanying drawings.

DETAILED DESCRIPTION

Figure 1:
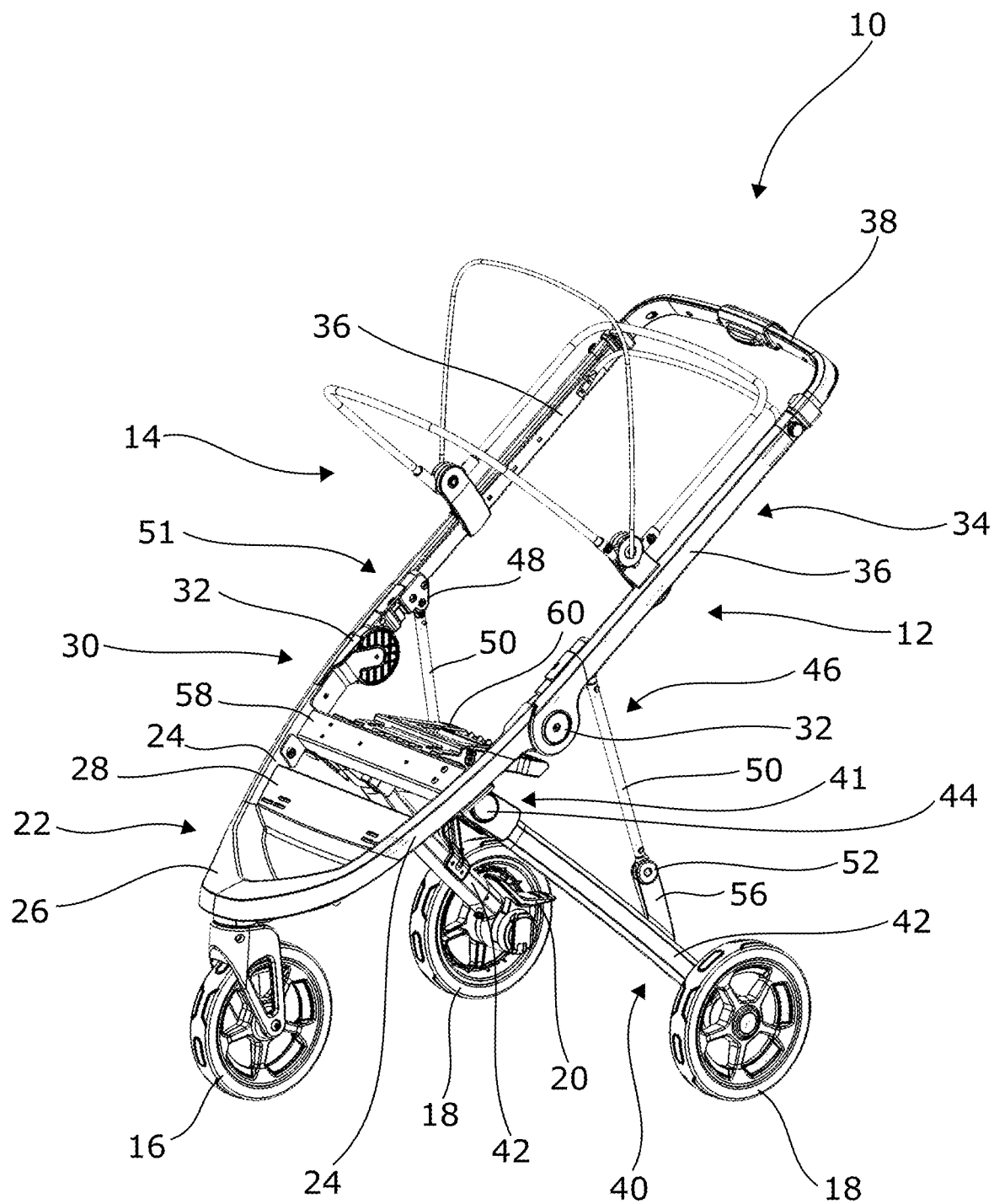
FIG. 1 shows in a schematic perspective view a stroller with a foldable frame assembly in its use configuration.

FIG. 1 shows a stroller 10 in perspective view. The stroller 10 comprises a foldable frame assembly 12 to which a child carriage component (not shown), such as a seat or basket, may be attached, preferably removably. Such a component may also be referred to as child carrying element. Further, the stroller 10 comprises a canopy of which a canopy frame 14 is shown in FIG. 1. A cover, such as a textile, may be attached to the canopy frame 14 to protect a child seated in the stroller 10 from sun and/or rain. The canopy may be folded out of the way to let a child enjoy good weather and may be deployed in the position as shown in FIG. 1 for protection.

Further, the stroller 10 comprises a front wheel 16 and two rear wheels 18. The rear wheels 18 are equipped with a brake that may be actuated by a foot pedal 20 to arrest the stroller 10 in place. The front wheel 16 may rotate about an essentially vertical axis to facilitate steering of the stroller 10.

During normal use the stroller 10 is standing on its wheels 16, 18. Accordingly, a direction upwards and downwards in the paper plane of, for example, FIG. 2, FIG. 5, FIG. 3 and FIG. 6 corresponds to an upward and downward direction of the stroller 10. Similar, a direction left and right in the paper plane of, for example, FIG. 3, FIG. 6, FIG. 4 and FIG. 7 corresponds to the left and right direction of the stroller 10. Usually, the stroller 10 is pushed forward with the front wheel 16 and child facing in the forward direction. Accordingly, the left-right direction in the paper plane of FIG. 2 and FIG. 5, the direction from and into the paper plane in FIG. 3 and FIG. 6 and the upward-downward direction in the paper plane of FIG. 4 and FIG. 7 corresponds to the forward and backward direction of the stroller 10.

As can be seen in the figures, the stroller 10 is symmetric with regard to its left-right direction. A plane of symmetry S is indicated in FIG. 3, FIG. 6, FIG. 4 and FIG. 7 with a dashed line. The plane of symmetry lies on the center of the stroller 10. As can be seen, the forward wheel 16 lies on the plane of symmetry, in particular when facing straight forward. Accordingly, the single front wheel 16 is still following a symmetric design. Nevertheless, slight deviations from the symmetry may be allowable. However, also two front wheels may be provided spaced apart in the left-right direction of the stroller 10, similar to the rear wheels 18. For example, additional and in particular non-load bearing parts may not be provided symmetrically, such as a single hook for holding a handbag or purse.

The frame assembly 12 provides the structural load bearing capabilities of the stroller 10. The frame assembly 12 comprises a first forward lower frame component 22, which comprises two symmetrically frame members 24 in the form of hollow bars having an essentially rectangular cross section. The frame members 24 and overall the frame component 22 extend from a lower forward end of the stroller 10 upwards and backwards. At their first lower forward end the two frame members 24 are connected with a transversal member 26, which is presently C-shaped and constitutes a hollow elongation of the frame members 24. The transversal member 26 may be understood as forming the lower forward end of the first frame component 22. The transversal member 26 may also be formed from two parts and/or be integral to the frame members 24. Both frame members 24 and the transversal member 26 may be a unitary one-piece construction, although shown as separate parts in the figures. The forward wheel 16 is swiveably attached at the forward end of the first frame component 22, for example at the transversal member 26.

Further, there is a cross member 28 arranged at the lower ends of the frame member 24 connecting them in the left-right direction. This cross member 28 may reinforce the first frame component 22 and/or serve to attach further items, such as the carrying element.

At the second upper end, the frame component 22 of the frame assembly 12 is attached to a first swivel joint assembly 30. Specifically, the first swivel joint assembly 30 comprises two symmetrically arranged swivel joints 32, each connected to the upper rearward end of a respective one of the frame members 24. Further, a second rearward frame component 34 of the frame assembly 12 is connected to the swivel joint assembly 30 with its first lower forward end. Specifically, the second frame component 34 comprises two symmetrically arranged frame members 36, which are similar in design to frame members 24 and are each connected to a respective one of the swivel joints 32. Each swivel joint 32 allows the respective frame members 24 and 32 connected thereto to swivel relatively to each other. Correspondingly, the first frame component 22 and the second frame component 34 may swivel relatively to each other. Accordingly, each swivel joint 32 has a central axis of rotation, which are coaxially arranged to each other. Further details of the first swivel joint assembly 30 and the swivel joints 32 will be explained below.

Attached at a rearward upper second end of each of the frame members 36 of the second frame component 34 is a common C-shaped handle element 38 that is configured for pushing and pulling the stroller 10. The handle 38 may also structurally reinforce the stroller 10 and/or be detachably connected for storage and replacement. The canopy frame 14 is attached to each of the frame members 36 between the first and second end of the frame component 34, respectively the frame members 36, in a middle region.

A third rearward lower frame component 40 is attached with an upper forward first end to a second swivel joint assembly 41. The rearward wheels 18 are attached at the rearward lower second end of the frame component 40. Specifically, the third frame component 40 comprises two symmetrically arranged frame members 42 that are similarly designed to the frame members 34 and 36. Each rear wheel 18 is attached to a respective one of the frame members 41, which may also be referred to as legs of the stroller 10.

The frame members 41 are not directly attached to each other but spaced apart in the left-right direction. Instead, they are each only attached to a respective swivel joint 44 of the second swivel joint assembly 41. In the present case, the swivel joints 44 are attached to a cross-bar 58, which is arranged in the left-right direction between the frame members 24 of the first frame component 22 in a middle area between the first end and second end of the frame component 22. The cross-bar 58 may be understood as part of the frame component 22 or as a separate part of the frame assembly 12. However, the respective swivel joints 44 may also be directly attached to one of the frame members 24 of the first frame component 22. The swivel joint assembly 41, respectively the swivel joints 44, allow the third frame component 40 and respectively the legs with the rear wheels 18 to rotate relatively to the first frame component 22. The cross-bar 58 may also serve to attach the child carrying element at a position at least very close to or at the center of gravity of the stroller, increasing its stability.

The frame assembly 12 further comprises a rearward fourth link frame component 46. Again, the link frame component 46 is designed symmetrically, albeit its parts are not similar in design to the other frame components. In particular, each side of the fourth frame component 46 is attached with its upper first end to a respective swivel joint 48 of a third swivel joint assembly 51. Each swivel joint 48 is arranged on a frame member 36 between the first and second end of the second frame component 34. In particular, the fourth frame component 46 comprises a hinged link with a rod 55 attached at its upper end to a respective one of the swivel joints 48 on each side of the stroller 10. Somewhat below the middle, the hinged link has a hinge 52. Further, the hinged link comprises a plate-like part 56 rigidly attached to a respective one of the legs of the stroller 10 respectively of the frame member 42. The hinges 52 may also be understood as being part of a fourth swivel joint assembly and the plate-like parts 56 being part of the third frame component 40. The main purpose of the link frame component 46 is to link the movement of the legs of the stroller 10 to the folding, e.g. swiveling, of the first frame component 22 and the second frame component 34. Accordingly, a user does not need to actuate the different frame components separately. Instead, their movement is linked, e.g. synchronized. The hinge 52 compensates for a distance change between the attachment of the fourth frame component to the third frame component 40 and the second frame component 34 during folding. Additionally, the link frame component 46 may increase the load bearing capabilities of the stroller 10.

The stroller 10 and its frame assembly 12 may be adjusted between a use configuration and a storage configuration, in particular by folding. The use configuration is shown in FIGS. 1 to 4 and the storage configuration in corresponding views in FIGS. 5 to 7. In the use configuration, the stroller 10 may be used to transport a child or infant while being pushed around on its wheels 16, 18. The storage configuration is intended for storing the stroller 10, for example in car. Both storage and handling, e.g. carrying, of the stroller 10 is facilitated in the storage configuration due to the reduced size. Preferably, the child carrying element is configured to fold together with the frame assembly 12. For that purpose, the child carrying element may also comprise a foldable frame and/or flexible parts, such as textiles. The use configuration may also be referred to as the deployed or unfolded configuration and the storage configuration as the folded or transport configuration.

Figure 5:
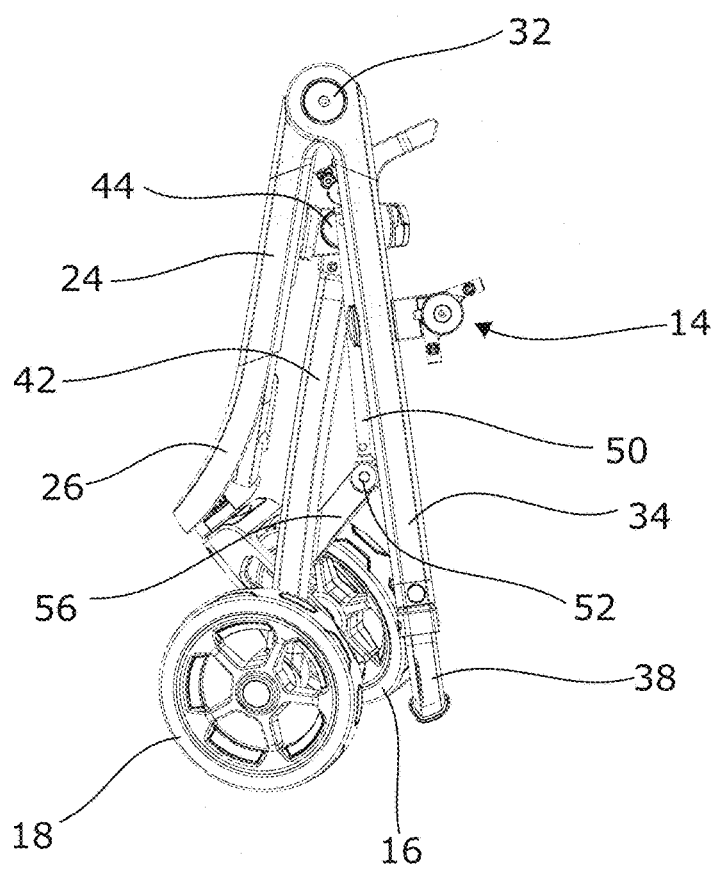
FIG. 5 shows a corresponding view to FIG. 2 with the foldable frame assembly in its storage configuration.

As can be seen in, for example, FIG. 5, for folding the frame assembly 12 and the stroller 10 from the use configuration into the storage configuration, the second frame component 34 is swiveled downwards towards the first frame component 22. Due to the link component 46, the legs, respectively the third frame component 40 is also folded, e.g. swiveled towards the front wheel 16 respectively the first frame component 22. During that movement, the hinged link will slightly kink to account for length discrepancies. Accordingly, the rearward wheels 18 are moved adjacent the front wheel 16, being essentially arranged at the same position in the forward-backward direction. The movements are enabled by the different swivel joint assemblies.

Figure 3:
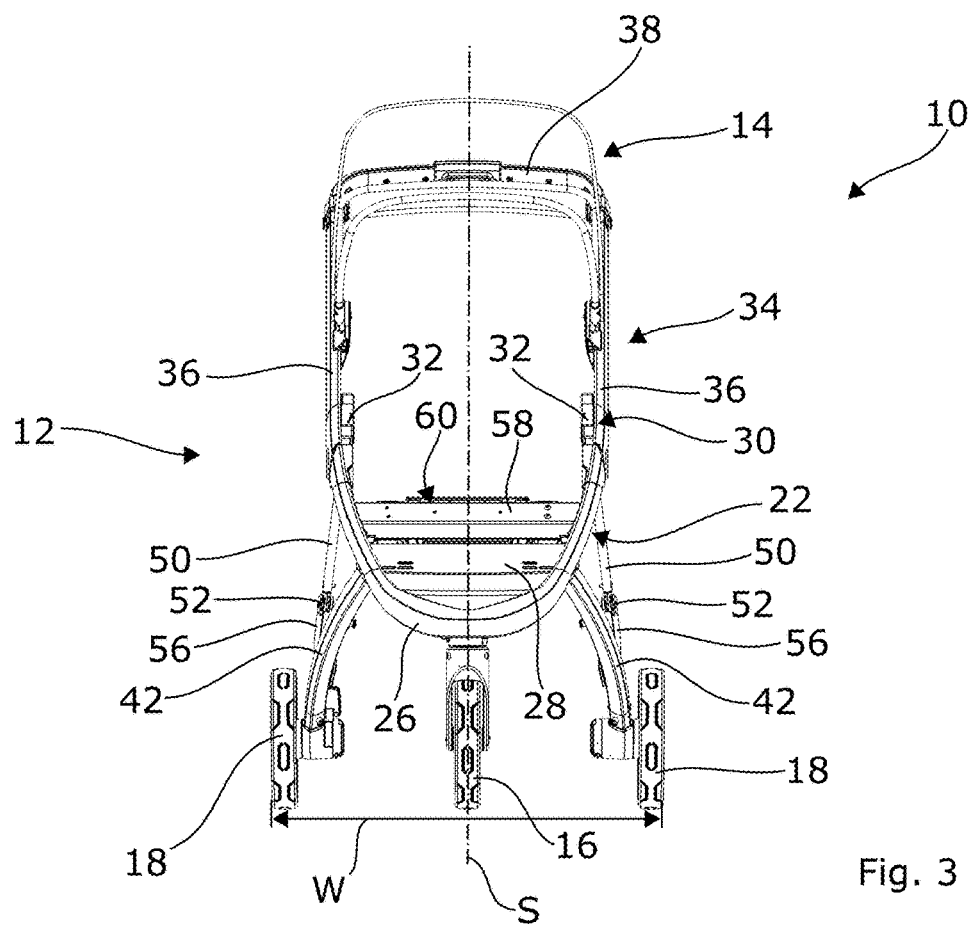
FIG. 3 shows the stroller according to FIG. 1 in a schematic front view.
Figure 4:
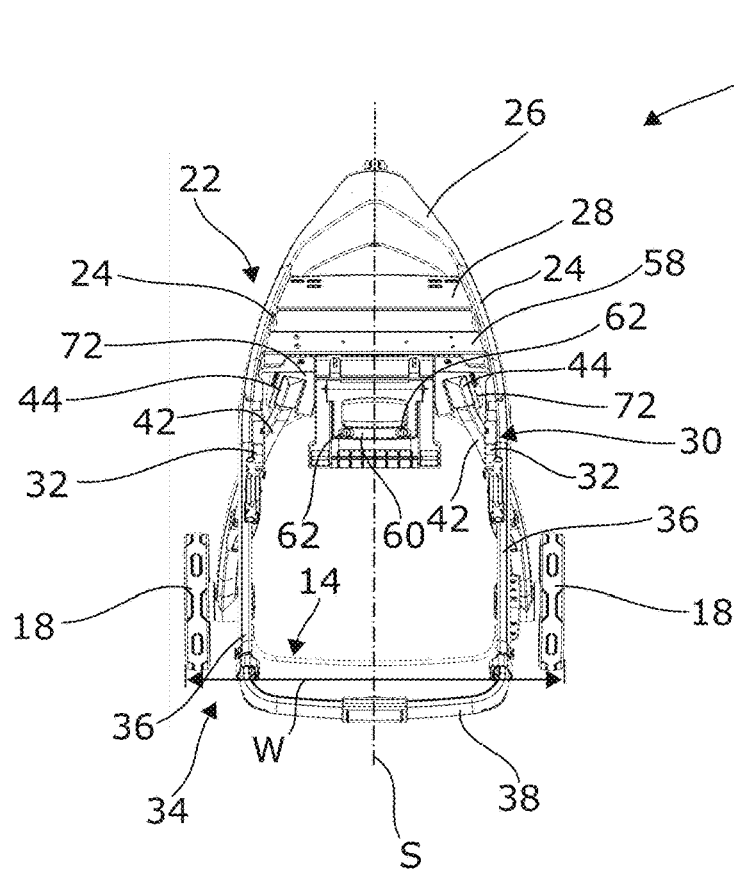
FIG. 4 shows the stroller according to FIG. 1 in a schematic top view.
Figure 6:
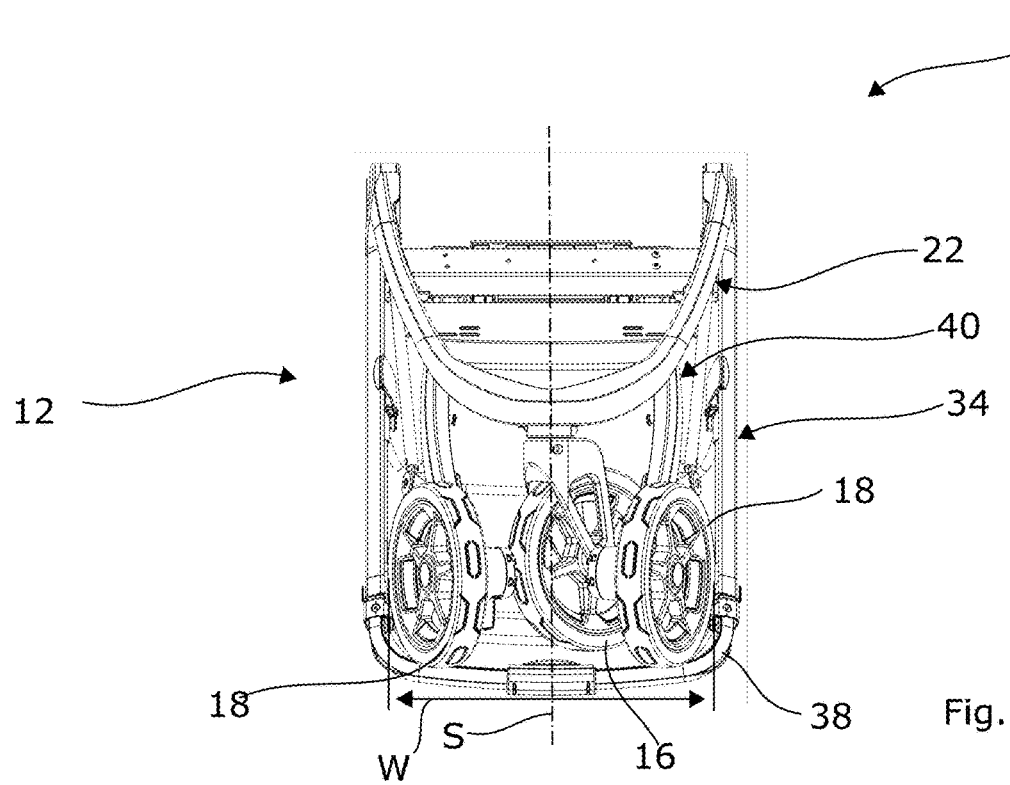
FIG. 6 shows a corresponding view to FIG. 3 with the foldable frame assembly in its storage configuration.
Figure 7:
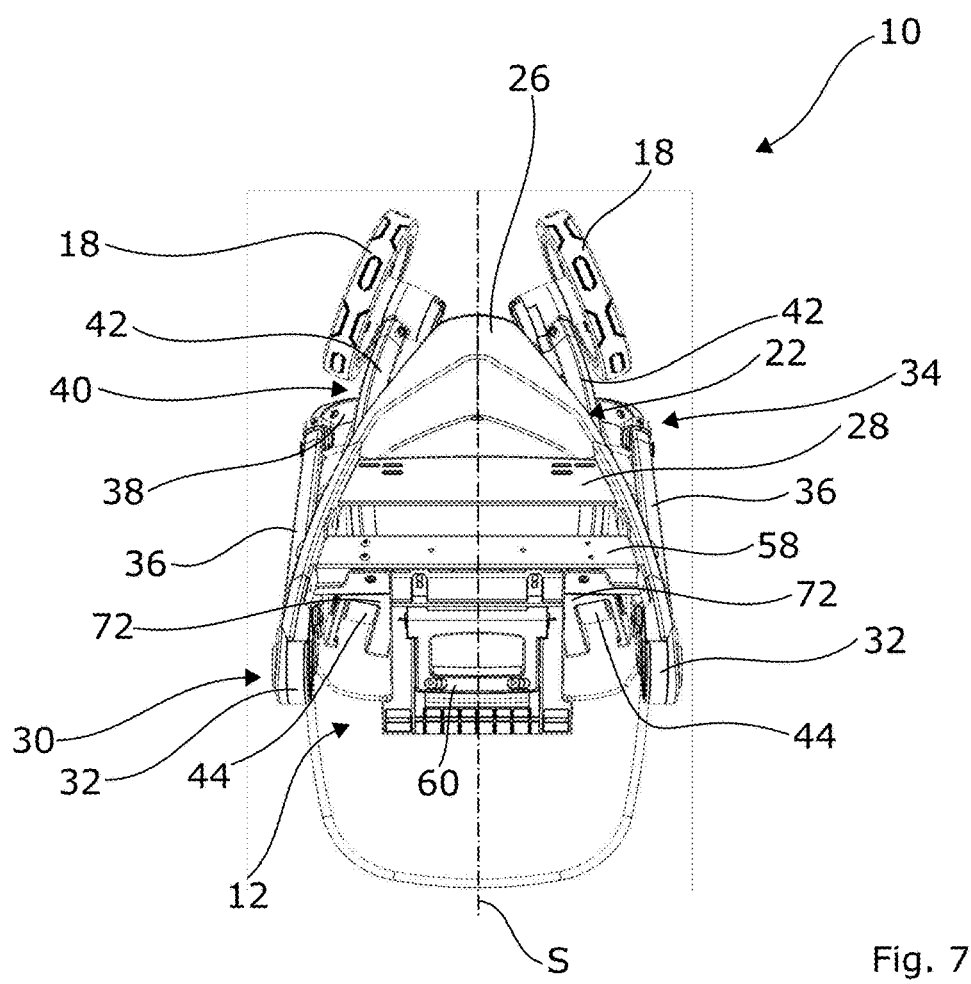
FIG. 7 shows a corresponding view to FIG. 4 with the foldable frame assembly in its storage configuration.

As can be taken from a comparison of FIG. 3 and FIG. 6, the third swivel joint assembly 42 is configured to guide the legs with the rear wheels 18 inwardly in the left-right direction towards the plane of symmetry S when folding the stroller 10 into the storage configuration. In other words, a width W defined by the rear wheels 18 may be reduced to a width which is smaller than the width of other stroller components like the frame component 34. For that purpose, the swivel axis of the respective joints 44 may be slightly tilted, their axis of rotation not being coaxial but rather intersecting at the plane of symmetry S. This tilt can be seen, for example, in FIG. 4 and FIG. 7. Further, the swivel joints 44 each comprise a bracket 72 that guides the frame members 42 appropriately during configuration change. To account for this inward movement, the hinges 52 and/or the joints 48 may allow inward tilting of parts of the fourth frame component 46. Such a design may provide a stroller 10 that is very resistant to tilting over due to its wide wheelbase of defined width W while simultaneously being collapsible into a very small folded configuration with a smaller width W. Furthermore, frame members 42 and wheels as well as the third swivel joint assembly 42 may be configured such that an inward folding positions the wheels 18 within an accommodating space defined by an imaginary translatory movement of the second rearward frame component 34 in a direction substantially perpendicular to a main extension plane of the frame component 34.

As can be taken from FIG. 5, the storage configuration is preferably such that the stroller may still stand on its wheels 16, 18. The stroller 10 may thus be easily stored upright. Collapsing of the stroller 10 into the storage configuration may preferably be gravity assisted. For example, lifting the stroller 10 at or close to its center of gravity, for example close at or directly at the cross-bar 58, may cause the stroller 10 to fold into the storage configuration. Alternatively or additionally, unfolding from the storage configuration may simply be caused by pushing downwardly onto the stroller, in particular when standing upright, as shown in FIG. 5. Preferably, the stroller 10 is pushed for that purpose at a similar or the same position as it is lifted during folding into the storage configuration.

Such an adjustment of the configuration may thus be easily performed with one hand. This is very comfortable, in particular when the user is still carrying its infant in the other hand. However, to prevent unwanted folding, at least one of the joints and/or joint assemblies is preferably lockable, thus preventing accidental relative rotation of the lockable parts.

Presently, the stroller 10 therefore comprises a locking mechanism for the first joint assembly 30, which comprises two lockable joints 32. The locking mechanism comprises an actuation element 60, which is configured as a swiveable carrying handle graspable by a user and attached close to or preferably at the center of gravity of the stroller at the cross-bar 58. When lifting the stroller 10 at the actuation element 60, thus possibly automatically unlocking the locking mechanism, the first frame component 22 and the second frame component 34 will rotate downwards at opposite sides to the actuation element. The actuation element 60 is arranged at a position below a seat portion of the stroller, for example below a fabric defining a bottom portion of a seat. Accordingly, a child seated in the stroller has to be taken out of the seat to access the handle. In this way, the handle is not accessible when a child sits in the stroller thereby preventing an erroneous or unintended operation of the handle which enhances child safety.

Figure 2:
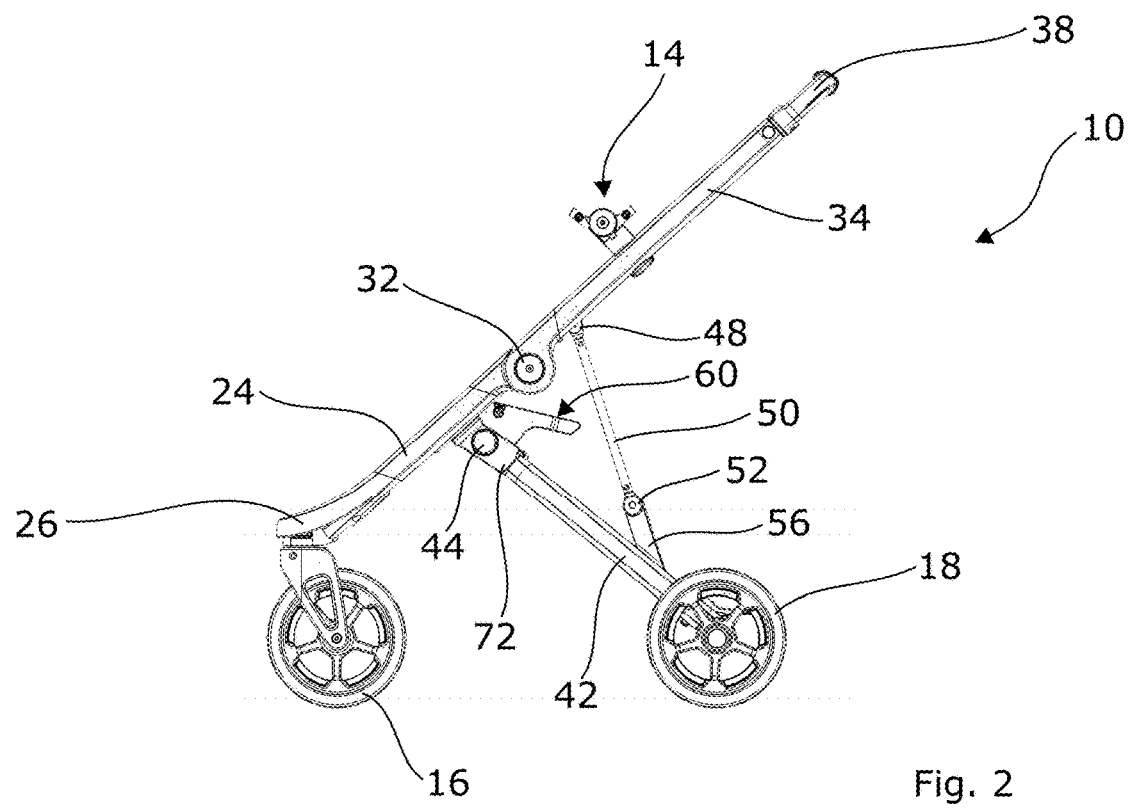
FIG. 2 shows the stroller according to FIG. 1 in a schematic side view.

As can be taken, for example, by a comparison of FIG. 2 with FIG. 5, the actuation element 60, e.g. handle 60, is lifted upwards to unlock the joints 32 to allow folding of the stroller in the storage configuration. Additionally or alternatively the stroller 10 may also be locked against folding in the storage configuration, thus requiring actuation of the handle before being able to unfold the stroller 10 into the use configuration. Preferably, the actuation element 60 is arranged to be accessible with the child carrying element still attached to the frame assembly 12.

Figure 11:
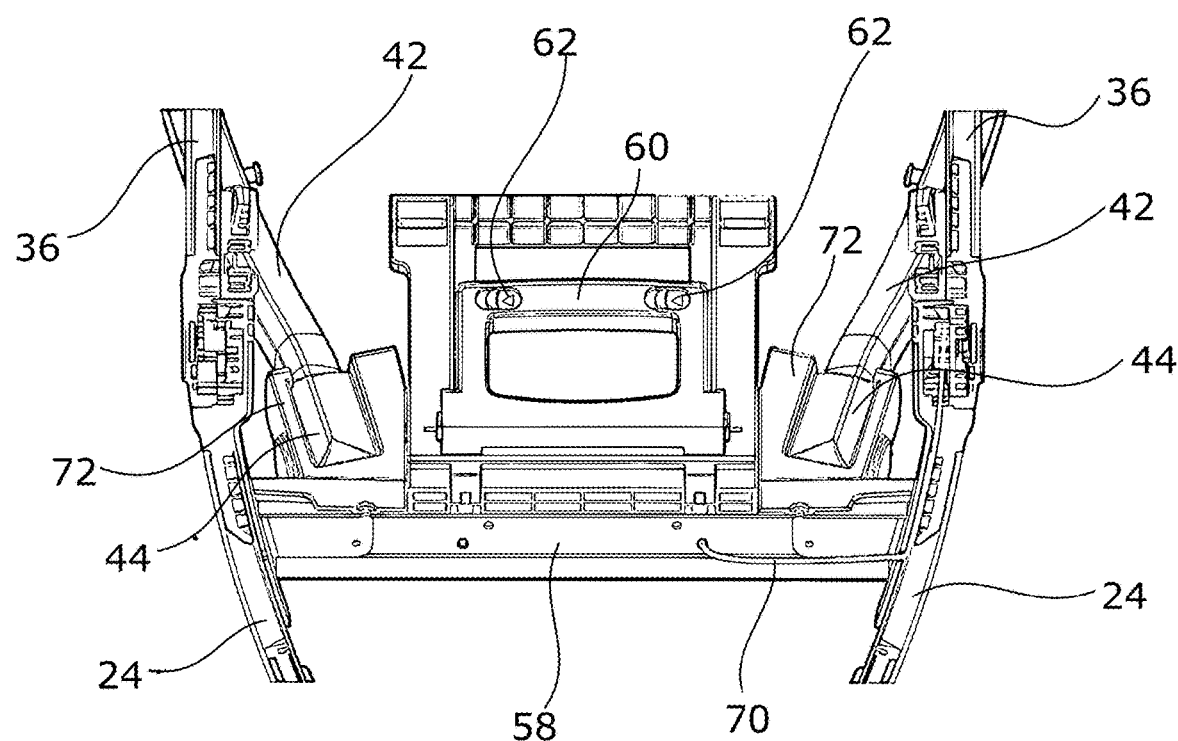
FIG. 11 shows an actuation element of the stroller according to FIG. 1 in a sectional view.

The actuation element 60 may comprise a lock to prevent its unwanted actuation. For example, the actuation element 60 may comprise sliding knobs 62 that must be actuated before swiveling the actuation element 60 is possible for folding of the stroller 10. Such knobs are illustrated in FIG. 11 and may simply slide a rod into and out of a corresponding opening, thus preventing actuation element movement. Both this lock and the locking of the joints 32 may be biased towards a locked position, thus resulting in a self-securing mechanism. For example, a spring may provide this bias.

Figure 8:
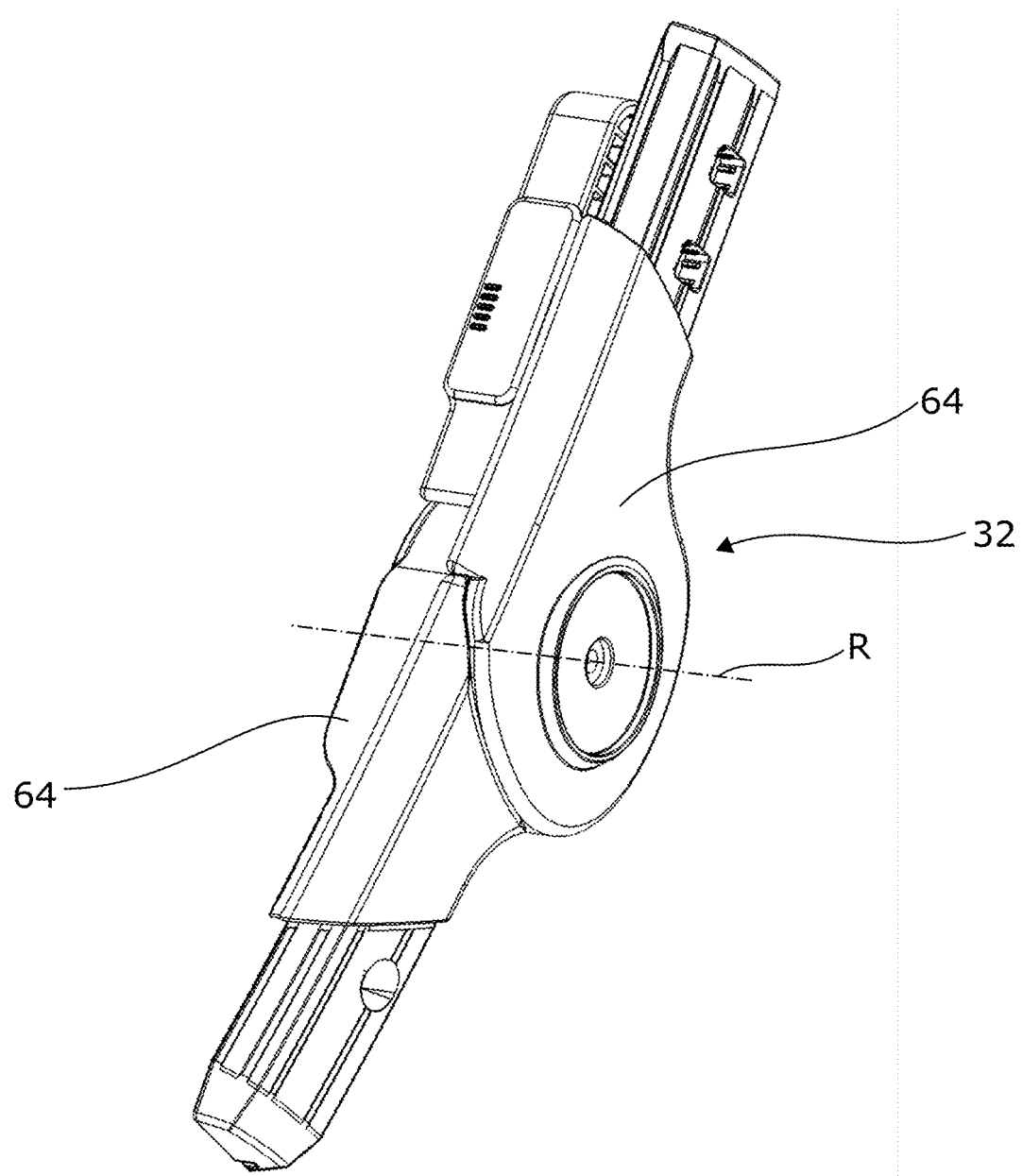
FIG. 8 shows a lockable swivel joint of the foldable frame assembly in a perspective view.
Figure 9:
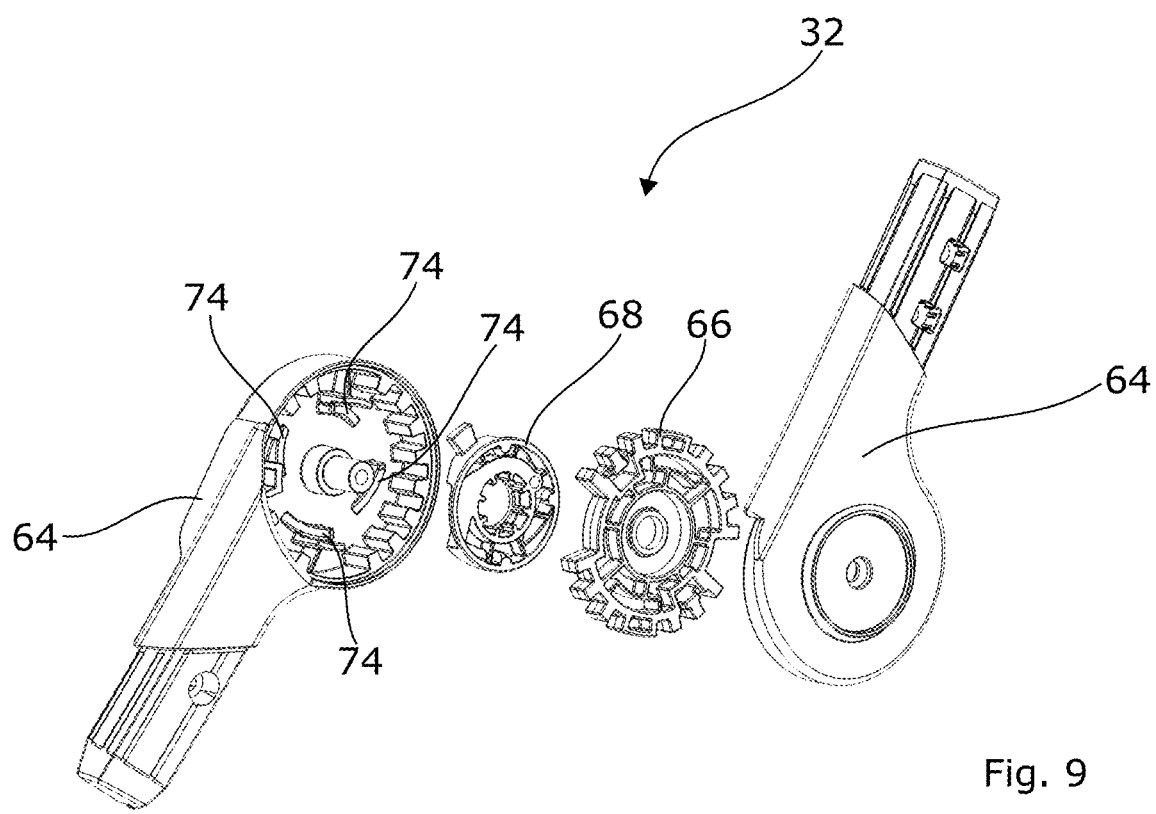
FIG. 9 shows the swivel joint according to FIG. 8 in an exploded view.
Figure 10:
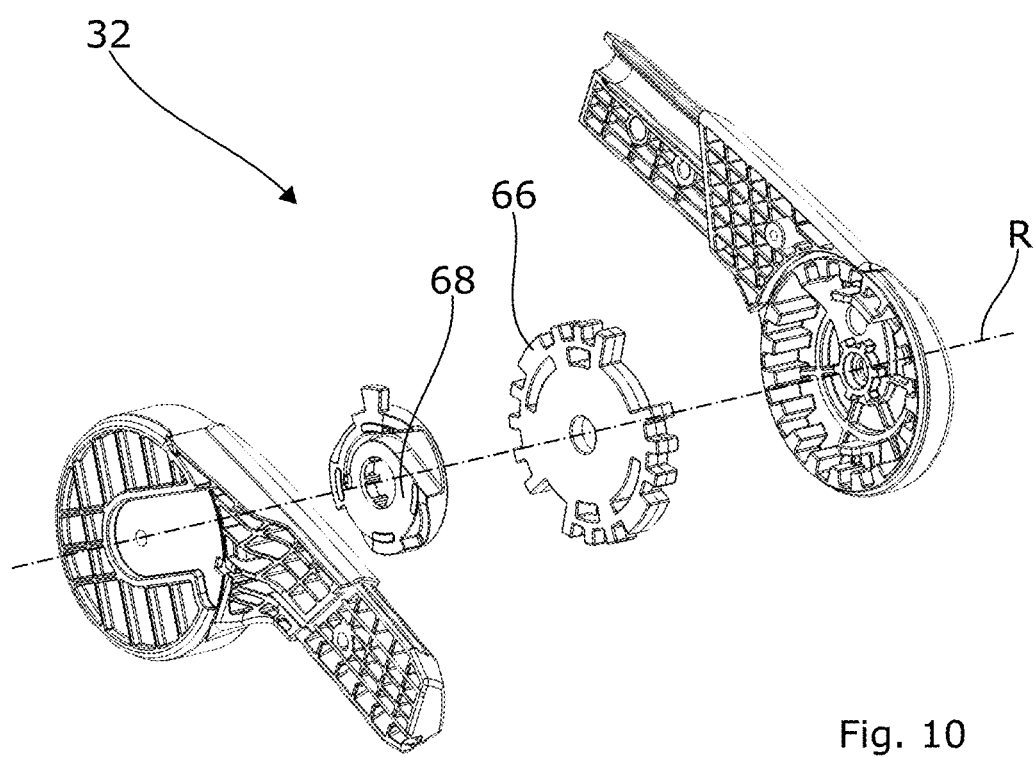
FIG. 10 shows the swivel joint according to FIG. 8 in another exploded view from a different perspective.

FIGS. 8 to 10 illustrate further details of the locking mechanism and the joints 32. Each joint 32 comprises two hinge elements 64, at which a respective frame member 24 or 36 is attached. The hinge elements 64 may rotate about the axis of rotation R, thus resulting in relative swiveling of the frame members 24 and 36. Accordingly, said axis may also be referred to as swivel axis R or axis of rotation R. Joints 32 were chosen as lockable joints since they are centrally located and connect two of the most load bearing frame components 22 and 34 with each other. Accordingly, locking joints 32 may result in a very rigid frame assembly 12 in the use configuration. Further, joints 32 already need to be sized according to those large loads, thus providing sufficient space for a reliable locking mechanism without requiring enlargement of the respective joints.

The hinge elements 64 form an internal space and may thus be considered as casing and/or housing elements, albeit load bearing casing elements. Within the interior space, a locking element 66 and a displacement element 68 are located. The locking element 66 may be translatory moved along the axis of rotation R, thus engaging or disengaging the two hinge elements 64 with each other. The engagement is form-fitting in the present example, although other engagement forms are possible. When the two hinge elements 64 are engaged with each other, the joint 32 is locked and relative movement of the respective frame components 22 and 34 is blocked. Due to the internal placing of these parts of the locking mechanism they are protected from the environment and the mechanism may thus be more reliable. Further, no moveable parts close to the child are accessible, thus preventing possible injuries.

As discussed before, the actuation element 60 is swiveled for actuating the locking mechanism. Swiveling is beneficial since it may relate to a pickup motion of the stroller 10 at the carrying handle, thus being very intuitive. However, the swiveling motion has to be transformed into a translatory movement of the locking element 66.

For that purpose, the displacement element 68 is connected to the actuation element 60 and arranged on inclined surfaces, which may also be referred to as inclined ramps 74. When the actuation element 60 is swiveled, the displacement element 68 is caused to rotate as well, for example by a mechanical connection. Due to that rotation and mounting on the inclined surfaces, the displacement element 68 is caused to slide along the axis of rotation R, thus pushing the locking element 66 into and/or out of engagement with one of the hinge elements 64. Preferably, the locking element is biased towards an engaged position, for example, with a spring. Accordingly, even in the case of failure, unwanted folding may be avoided. Further, for increased reliability and rigidity of the frame assembly 12, both joints 32 may be lockable. Alternatively, only one of the two joints 32 may be lockable for a very cost-effective frame assembly 12.

Figure 12:
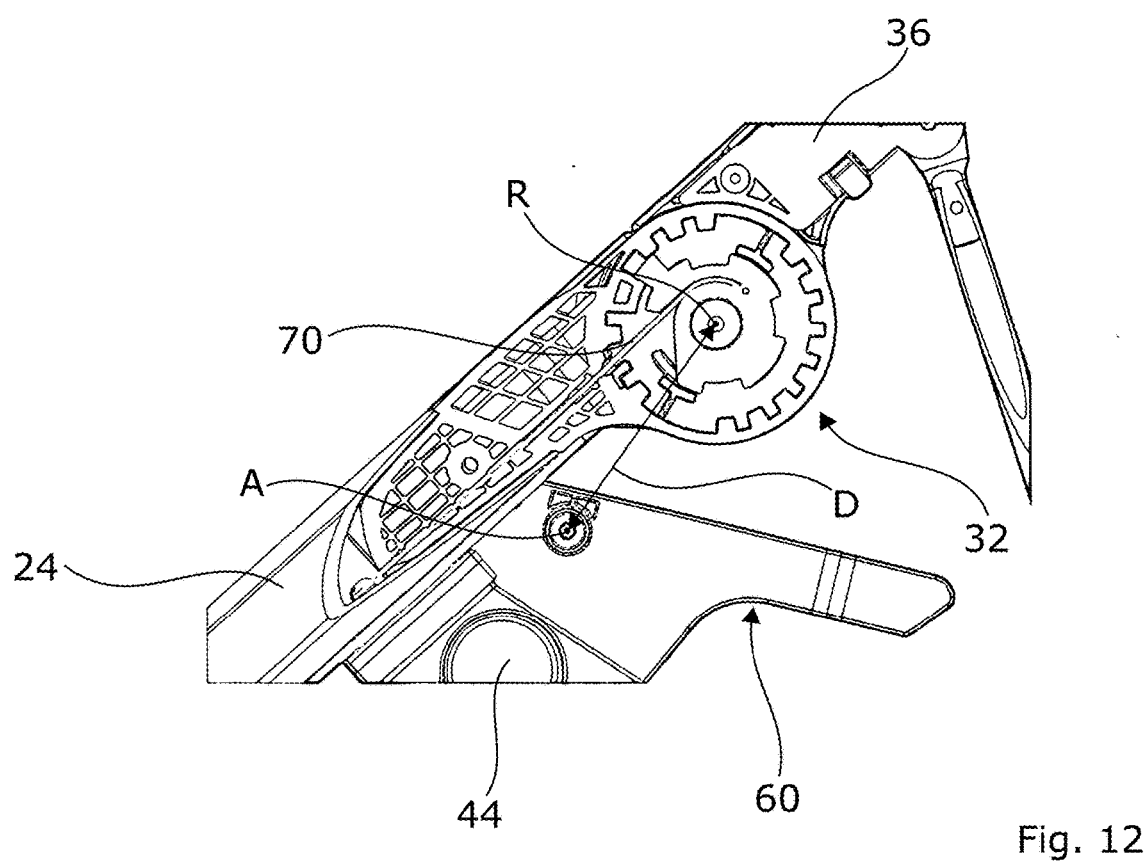
FIG. 12 shows in another sectional view the swivel joint according to FIG. 8.

As can be taken from the figures, the actuation element 60, in particular its axis of movement, e.g. its swivel axis A, is spaced apart from the axis of rotation R of the joints 32 respectively the locking mechanism. Accordingly, the swivel axis A of the actuation element 60 is arranged at a distance D from the axis of rotation R as is shown in FIG. 12. The actuation element 60 is linked to the displacement element 68 with a wire 70. For example, the wire 70 is shown in the more detailed illustration of the actuation element 60 in FIG. 11 and the section view of the joint 32 in FIG. 12. As can be seen, the wire 70 is also at least partially routed through the interior of the frame member 24.

The wire 70 is thus protected and the mechanism more reliable. Further, pinching a finger with the wire 70 may thus be avoided. For that purpose, part of the wire 70 may also be routed on the underside of the cross-bar 58 and/or the actuation element 60. A wire is a cost-effective, light-weight and reliable means for remote actuation, e.g. force transmission between spaced-apart parts. Although FIG. 11 and FIG. 12 show only one wire for actuating a displacement element 68 of one joint 32, it is to be noted that according to the embodiment a further wire (not shown) is coupled to another displacement element of the other joint 32 in a similar manner so that the displacement elements of both joints 32 are simultaneously operable by means of a single actuation element 60. In general, the operating element 60 may be operatively coupled to all locking mechanisms of joints so that all locking mechanisms may be operated remotely, simultaneously and by means of a single operating element 60.

Such remote actuation of the locking mechanism is also beneficial since the placement of actuation element 60 may be more freely chosen. If the actuation element 60 would instead be arranged on the axis of rotation R of the joints 32, the frame assembly may possibly require another cross-bar or unfavorable attachment of the rear legs to the rest of the frame assembly 12. Further, such an arrangement could limit the space for placement of the child carrying element. The actuation element 60 might be placed at a location that is easy to reach due to the remote operation of the locking mechanism. In addition, the actuation element 60 may thus be easily placed at a location where lifting of the stroller 10 causes a comfortable self-collapsing of the stroller 10, such as close at or on the center of gravity of the stroller 10, while also avoiding the risk of pinching limbs of a user with any parts of the frame.

In the embodiments shown in the figures, the frame members are essentially straight. However, the frame members may also have a curved or kinked shape.

The invention claimed is:

1. A foldable frame assembly for a stroller, the frame assembly comprising:
   a first forward lower frame component with a first end configured for attachment of at least one forward wheel and with an opposite second end attached to a first swivel joint assembly;
   a second rearward frame component with a first end attached to the first swivel joint assembly and with an opposite second end configured for arrangement of a handle assembly;
   a third rearward lower frame component with a first end attached to a second swivel joint assembly arranged on the first frame component between the first end and the second end of the first frame component and with an opposite second end configured for attachment of at least one rearward wheel;
   a rearward fourth link frame component with a first end attached to a third swivel joint assembly arranged on the second frame component between the first end and the second end of the second frame component and with an opposite second end attached to a fourth swivel joint assembly arranged on the third frame component between the first end and the second end of the third frame component; and
   a locking mechanism adjustable between a locked position and an unlocked position, wherein the locking mechanism is configured to releasably lock the foldable frame assembly in a use configuration or storage configuration by releasably and internally locking at least one of the respective swivel joint assemblies, wherein the locking mechanism comprises an actuation element configured to adjust the locking mechanism between the unlocked and the locked position wherein the actuation element is arranged at a distance from a swivel axis of at least one internally lockable swivel joint of the respective swivel joint assembly.

2. The frame assembly according to claim 1, wherein the actuation element is a handle.

3. The frame assembly according to claim 1, wherein the actuation element is arranged transversely between two frame members of a frame component.

4. The frame assembly according to claim 1, wherein the locking mechanism is configured for remote actuation by the actuation element.

5. The frame assembly according to claim 1, wherein the frame assembly is configured to self-collapse from the use configuration to the storage configuration in response to an actuation of the actuation element.

6. The frame assembly according to claim 1, wherein the respective lockable swivel joint comprises two hinge elements that define an interior space in which a locking device of the locking mechanism is arranged, wherein the two hinge elements are configured to be rotated relatively to each other about a common swivel axis.

7. The frame assembly according to claim 6, wherein the locking device comprises a locking element moveable between a first position and a second position along the swivel axis in the interior space of the swivel joint, wherein in the first position the locking element locks the two hinge elements in their relative rotational positions to each other and wherein in the second position the locking element releases rotational movement of the two hinge elements.

8. The frame assembly according to claim 7, wherein the frame assembly is configured so that an adjustment of the locking mechanism causes a rotation of a displacement element of the locking mechanism around the swivel axis, wherein the locking mechanism comprises an inclined ramp arranged on a surface facing the locking element, so that rotation of the displacement element causes it to glide along the inclined ramp and moves the locking element transversely between the first position and the second position along the swivel axis.

9. The frame assembly according to claim 1, wherein the first frame component comprises a cross-bar member,
wherein the third frame component is attached to the cross-bar member via the second swivel joint assembly, and
wherein the actuation element is arranged on the cross-bar member.

10. The frame assembly according to claim 1, wherein in the storage configuration, the frame components are arranged adjacent to each other.

11. The frame assembly according to claim 1, wherein in the use configuration, the first frame component extends upwardly from its first end to its second end and the second frame component extends upwardly from its first end to its second end.

12. The frame assembly according to claim 1, wherein the locking device is arranged inside a swivel joint of the first swivel joint assembly.

13. The frame assembly according to claim 1, wherein the wheels or respective ends of the frame components configured for the attachment of the wheels move towards each other when folding the frame assembly from the use configuration into the storage configuration.

14. The frame assembly according to claim 1, wherein one swivel joint assembly comprises two internally lockable swivel joints and the actuation element is configured to simultaneously unlock both lockable swivel joints.

15. The frame assembly according to claim 1, wherein the frame assembly is configured to self-collapse from the use configuration to the storage configuration in response to an upward pulling motion on the actuation element.

16. The frame assembly according to claim 1, wherein in the storage configuration, the frame components extend in essentially the same direction.

17. The frame assembly according to claim 1, wherein in the use configuration, the second frame component extends in essentially the same direction as the first frame component.

18. The frame assembly according to claim 1, wherein in the use configuration, any swivel axis of the first, third, or fourth swivel joint assembly extends essentially horizontally.

19. The frame assembly according to claim 1, wherein in the use configuration, any swivel axis of the second swivel joint assembly is tilted downwardly towards a center of the frame assembly.

20. A stroller, comprising:
three or four wheels;
a baby or child carriage component; and
a foldable frame assembly comprising:
a first forward lower frame component with a first end configured for attachment of at least one forward wheel and with an opposite second end attached to a first swivel joint assembly;
a second rearward frame component with a first end attached to the first swivel joint assembly and with an opposite second end configured for arrangement of a handle assembly;
a third rearward lower frame component with a first end attached to a second swivel joint assembly arranged on the first frame component between the first end and the second end of the first frame component and with an opposite second end configured for attachment of at least one rearward wheel, wherein a swivel axis of the second swivel joint assembly intersects a longitudinal middle plane of the frame assembly at an oblique angle;
a rearward fourth link frame component with a first end attached to a third swivel joint assembly arranged on the second frame component between the first end and the second end of the second frame component and with an opposite second end attached to a fourth swivel joint assembly arranged on the third frame component; and
a locking mechanism adjustable between a locked position and an unlocked position, wherein the locking mechanism is configured to releasably lock the foldable frame assembly in a use configuration or storage configuration by releasably and internally locking at least one of the respective swivel joint assemblies, wherein the locking mechanism comprises an actuation element configured to adjust the locking mechanism between the unlocked and the locked position wherein the actuation element is arranged at a distance from a swivel axis of at least one internally lockable swivel joint of the respective swivel joint assembly.

21. The stroller according to claim 20, wherein the second end of the third frame component moves inward towards the longitudinal middle plane of the frame assembly when folding the frame assembly from the use configuration to the storage configuration.

22. The stroller according to claim 20, wherein the second swivel joint assembly comprises a first swivel joint having a first swivel axis and a second swivel joint having a second swivel axis, and
wherein the first swivel axis and the second swivel axis intersect.

23. The stroller according to claim 20, wherein a width of the frame assembly in the storage configuration is smaller than a width of the frame assembly in the use configuration.

24. The stroller according to claim 20, wherein a left frame member and a right frame member of the third frame component are each angled towards the longitudinal middle plane of the frame assembly when the frame assembly is in the storage configuration.

25. The stroller according to claim 20, wherein the frame assembly is configured to self-collapse from the use configuration to the storage configuration in response to an upward pulling motion on the actuation element.

26. A stroller, comprising:
a first forward lower frame component with a first end attached to a forward wheel and with an opposite second end attached to a first swivel joint assembly;
a second rearward frame component with a first end attached to the first swivel joint assembly and with an opposite second end configured for arrangement of a handle assembly;
a third rearward lower frame component with a first end attached to a second swivel joint assembly arranged on the first frame component between the first end and the second end of the first frame component and with an opposite second end attached to a first rearward wheel and a second rearward wheel; and
a rearward fourth link frame component with a first end attached to a third swivel joint assembly arranged on the second frame component between the first end and the second end of the second frame component and with an opposite second end attached to a fourth swivel joint assembly arranged on the third frame component;
wherein the first rearward wheel and the second rearward wheel move towards the forward wheel when folding the frame assembly from a use configuration to a storage configuration, and
wherein the first rearward wheel and second rearward wheel move laterally towards each other when folding the frame assembly from the use configuration to the storage configuration.

* * * * *